United States Patent [19]

Suzuki et al.

[11] 4,435,077

[45] Mar. 6, 1984

[54] OPTICAL MAGNIFICATION ENLARGEMENT TYPE COPYING MACHINE

[75] Inventors: Kazuhiro Suzuki; Toshikatsu Takahashi, both of Ebina, Japan

[73] Assignee: Fuji Xerox Co., Ltd., Tokyo, Japan

[21] Appl. No.: 394,961

[22] Filed: Jul. 2, 1982

[30] Foreign Application Priority Data

Jul. 8, 1981 [JP] Japan .................. 56-106398

[51] Int. Cl.³ .................. G03B 27/48; G03B 27/50; G03B 27/70
[52] U.S. Cl. .................. 355/51; 355/5; 355/7; 355/14 C; 355/45
[58] Field of Search .................. 355/14 C, 45, 51, 7, 355/5, 57

[56] References Cited

U.S. PATENT DOCUMENTS

| | | | |
|---|---|---|---|
| 4,174,175 | 11/1979 | DiMaria | 355/5 X |
| 4,260,248 | 4/1981 | Murata et al. | 355/14 C X |
| 4,278,346 | 7/1981 | Toriumi et al. | 355/5 X |
| 4,353,643 | 10/1982 | Statt | 355/51 X |

*Primary Examiner*—Richard A. Wintercorn
*Attorney, Agent, or Firm*—Sughrue, Mion, Zinn, Macpeak & Seas

[57] ABSTRACT

A magnification enlargement type copying machine in which the image of a picture on a film is projected onto a screen or a photo-sensitive drum by an image enlarging lens to be observed and copied. The size of a picture on a film to be copied and a size of a copying sheet on which an enlarged image of said picture are inputted to the system. An enlargement magnification is then observed and following correct placement on the proposed sheet, the film is moved from the observation position to a scanning start position according to the size of the picture on the film. The film is then scanned at a speed corresponding to a set magnification thereby to form the image of the picture on a photosensitive drum. An arithmetic control unit is used for calculating a distance between an observation position and a scanning start position from a size of a picture on the film and calculates the film scanning speed from a set magnification.

9 Claims, 3 Drawing Figures

OPTICAL MAGNIFICATION ENLARGEMENT TYPE COPYING MACHINE

BACKGROUND OF THE INVENTION

This invention relates to a magnification enlargement type copying machine. In particular, this invention relates to a system in which the image of a picture on a film is enlarged to a desired magnification and is then copied on a desired part of a copying sheet of any size.

A variable magnification enlargement type copying machine is disclosed in the specification of Japanese Patent Application Publication No. 37825/1979. In the copying machine of this prior art, the scanning start position is shifted according to the degree of magnification so that a copying image is positioned at the center of a copying sheet. In order to determine the scanning start position, which varies with the magnification, a first positioning device for determining a film position for projecting the image on an observing screen and second positioning device using a photo-sensor or switch are provided. However, in order for this arrangement to determine film positions for magnifications which are selected as desired, it is necessary to use a number of positioning sensors.

SUMMARY OF INVENTION

Accordingly, an object of this invention is to provide a magnification enlargement type copying machine in which, without using a number of positioning devices, the images of pictures different in size on films are enlarged to any magnification for copying on a copying sheet of any size.

In accordance with the invention, a magnification enlargement type copying machine is provided in which the image of a picture on a film is projected onto a screen or a photo-sensitive drum by an image enlarging lens to be observed and copied. Specifically, the invention comprises; means for inputting the size of a picture on a film which is to be copied and for specifying the size of a copying sheet on which the enlarged image of the picture should be copied. An enlargement magnification is set by observation with the film at an observation position to project the image of the picture on the film onto a screen. A scanning platform is used for moving the film from an observation position to a scanning start position according to the size of the picture on the film and then to scan the film at a speed corresponding to a set magnification thereby to form the image of the picture on the photo-sensitive drum through a slit. An arithmetic control circuit calculates the distance between an observation position and a scanning start position from the size of a picture on a film and calculating a film scanning speed from a set magnification to control the means for moving a film. Image position determining means changes the position of an image which is copied on a copying sheet. In one preferred embodiment of the invention, the arithmetic control circuit includes a microcomputer.

With this arrangement, the provision of positioning structure except for purposes of observation is unnecessary. Furthermore, with the copying machine of the invention, the size of a copying sheet, the position of the image on a copying sheet and the magnification can be selected as desired. That is, the operational degree of freedom of the copying machine is considerable. This invention will be described with reference to the attached drawing and the description of the preferred embodiment that follows.

DESCRIPTION OF THE PREFERRED EMBODIMENT

This invention will be now described with reference to the accompanying drawing.

Figure 1:
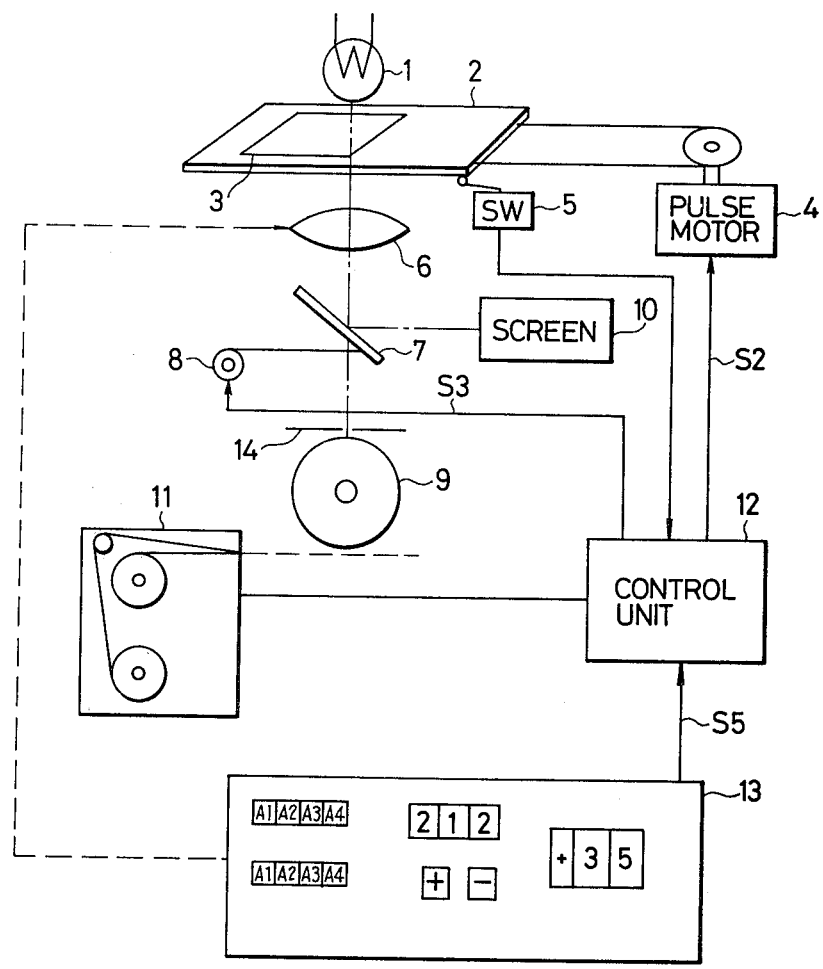
FIG. 1 is an explanatory diagram showing the arrangement of one embodiment of an optional magnification enlargement type copying machine according to this invention.

Referring first to FIG. 1, one embodiment of the invention is shown. In FIG. 1, reference numeral 1 designates an exposure lamp projecting onto a scanning stand 2 having a film 3 placed thereon. A film scanning pulse motor 4 and an observation position determining switch 5 are associated with the stand 2. An enlarging zoom lens 6 is placed below the stand with a screen projection mirror 7 receiving the enlarged image. A mirror position switching motor 8 moves the mirror 7. A photo-sensitive drum 9 is positioned below the mirror 7 with a slit 14 interposed therebetween. An observing screen 10 receives the reflected enlarged image from mirror 7. Numeral 11 is a roll sheet supply unit. An arithmetic control unit 12 including a microcomputer and a data setting unit 13 for setting data such as magnification values from the control function of the system.

In operation of this system, data such as the size of a picture on film which is to be copied, copying sheet size, enlargement magnification, and the position on the sheet where the image should be copied, are set by entering the data in setting unit 13. The arithmetic control unit 12, receiving the data through line S5, calculates the distance between an observation position and a scanning start position by using the designated size of the copying picture from the film which has been preset in the data setting unit 13. The distance is determined using a calculating equation stored in the memory device of the arithmetic control unit 12 to calculate a distance between an observation position and a scanning start position. Such an equation is well within the state of the art as requiring only known geometric considerations.

The arithmetic control unit 12 stores the distance thus calculated in the memory device. The photo-sensitive drum 9 is rotated at a constant speed and on a real time basis, the arithmetic control unit 12 calculates a film scanning speed by using the magnification data set by the data setting unit 13 according to a calculating equation which is also stored in the memory device to calculate a film scanning speed according to a magnification. Such an equation is also within the state of the art. The film scanning speed thus calculated is also stored in the memory device.

The arithmetic control unit 12 controls the operation of the entire copying machine according to an operational program which is also stored in the memory device. In this case, in response to the magnification set in the data setting unit 13, the position of the zoom lens 6 on the optical axis is moved or a suitable one of the group of projecting lenses 6 is selected. That is, while one lens is shown, a number may be employed on a mounting that selectively places the selected lens into the optical path.

The operator while observing the screen 10 operates the scanning pulse motor 4 through a line S2 to move the scanning stand 2 via the pulley mechanism as shown. When the observation position determining switch 5 is turned on, the scanning stand 2 motion is stopped and the image is properly placed. During this procedure, the mirror position switching motor 8 for the screen projection mirror 7 is actuated through a line S3, so that the mirror 7 is turned to be set at a screen projection position as shown in FIG. 1. As a result, the image of the picture on the film 3 placed on the scanning stand 2 is formed on the screen 10 through the lens 6 and the mirror 7 with the aid of light from the lamp 1.

In copying the picture thus positioned, the arithmetic control unit 12 operates the motor 8, so that the mirror 7 is turned from the display position to be set at a copying position. Furthermore, the arithmetic control unit 12 operates the pulse motor 4 to move the table 2 a distance corresponding between the observation position and the scanning start position, which has been calculated and stored as described above. That is, the scanning stand 2 is moved to the scanning start position corresponding to the size of the copying picture on the film. The movement distance is determined by the number of pulses which drive the pulse motor 4. When the scanning stand 2 reaches the scanning start position, the arithmetic control unit 12 operates the pulse motor 4 at the scanning speed corresponding to the magnification which has been calculated and stored as described above, so that the film 3 is scanned. The scanning speed is determined by the frequency of the pulse motor 4 driving pulses. Thus, the image of the picture on the film is projected onto the photo-sensitive drum 9 through the lens 6 and the slit 14.

The image formed on the photo-sensitive drum 9 is developed and is then transferred onto a copying sheet supplied from the roll sheet supply unit 11. The step program in the arithmetic control unit 12 controls the scanning start time of the scanning stand 2 and the sheet supply start time of the roll sheet supply unit 11 according to the data representative of the position of the image on the copying sheet, which has been set by the data setting unit 13 to control the position of the image on the copying sheet.

As is apparent from the above description, the use of positioning means other than a scanning start position determination is unnecessary according to the invention. Furthermore, the scanning start position is controlled according to the size of a copying picture on a film, and the scanning speed is changed according to a required enlargement magnification, according to the invention. Therefore, the copying machine according to the invention can change the magnification as desired, use various sheet sizes and change the image position. That is, it can perform a variety of precise delicate functions to obtain an accurate enlarged image onto a number of different sheet sizes.

Figure 2:
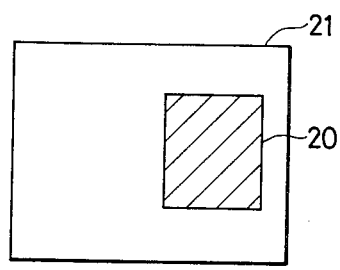
FIGS. 2 and 3 are diagrams showing the relationships between copying sheets and the sizes of images which are copied thereon.
Figure 3:
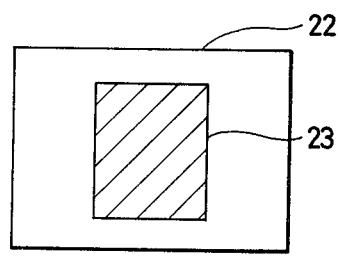

Therefore, according to the invention as shown in FIG. 2, the image 20 of a picture on a film can be copied on a part of a large sheet 21 and as shown in FIG. 3, a part of the image 22 of a picture on a film can be enlarged to be copied on a small sheet 23. It is understood that in FIG. 2 the hatched portion is the image while in FIG. 3 the hatched portion is the sheet.

Modifications of the embodiment disclosed herein may be practiced without departing from the scope of the invention.

We claim:

1. A magnification enlargement copying wherein an image of a picture on a film projected from observation and copying comprising:
    control means having an input section for receiving data on the size of said film, the size of a sheet on which an enlarged image will be copied and the amount of magnification of said image;
    positioning means receiving said film and moving it from an observation position to a film scanning start position;
    optical means for magnifying said film or a portion thereof and projecting it for observation and copying;
    arithmetic means associated with said control means for determining a distance between said observation position and a scanning start position from a size of a picture on said film and calculating film scanning speed from a magnification from said optical means to control said positioning means; and
    copying means responsive to an image projected by said optical means and controlled by said control means.

2. The enlargement copier of claim 1, wherein said positioning means receiving said film comprises a scanning stand for holding said film, a pulse motor responsive to said control means for moving said scanning stand and, means responsive to movement of said scanning stand to determine when it is in said observation position.

3. The enlargement copier of claim 1, wherein said optical means comprises a light source to illuminate said film, a projection mirror and enlarging lens means to direct an enlarged image from said film onto said mirror.

4. The enlargement copier of claim 3, further comprising means responsive to said control means for switching the position of said mirror from an observation position to a copying position.

5. The enlargement copier of claim 4, further comprising an observation screen receiving said enlarged image when said enlarged image is in said observation position.

6. The enlargement copier of claim 3, wherein said enlargement lens means comprises a zoom lens movable along an optical axis of said optical means to vary the enlargement of said image.

7. The enlargement copier of claim 3, wherein said enlargement lens means comprises a group of enlargement lens selectively positioned along an optical axis of said optical means, each lens having a different magnification factor to vary the enlargement of said image.

8. The enlargement of copier of claim 1, wherein said copying means comprises a photo-sensitive drum having said enlarged image focused thereon for forming a latent image and sheet supply means for supplying paper in accordance with data from said input section to transfer an image developed from said latent image onto said paper.

9. The enlargement copier of claim 8, wherein said sheet supply means comprises a roll supply and wherein said arithmetic means controls the supply rate of paper to position said image onto said paper in accordance with data from said input section.

* * * * *